(12) United States Patent
Yang et al.

(10) Patent No.: US 12,251,692 B2
(45) Date of Patent: Mar. 18, 2025

(54) METHOD OF SYNTHESIZING HIGH-EFFICIENCY BIFUNCTIONAL ELECTROCATALYSTS

(71) Applicant: University of Central Florida Research Foundation, Inc., Orlando, FL (US)

(72) Inventors: Yang Yang, Orlando, FL (US); Jinfa Chang, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 385 days.

(21) Appl. No.: 17/303,005

(22) Filed: May 18, 2021

(65) Prior Publication Data

US 2021/0354120 A1 Nov. 18, 2021

Related U.S. Application Data

(60) Provisional application No. 63/026,471, filed on May 18, 2020.

(51) Int. Cl.
*B01J 37/34* (2006.01)
*B01J 27/185* (2006.01)
(Continued)

(52) U.S. Cl.
CPC ......... *B01J 37/348* (2013.01); *B01J 27/1853* (2013.01); *B01J 35/00* (2013.01);
(Continued)

(58) Field of Classification Search
CPC ........ C25B 1/04; C25B 11/091; B01J 37/348; B01J 37/28; B01J 27/1853
See application file for complete search history.

(56) References Cited

U.S. PATENT DOCUMENTS

2015/0259810 A1* 9/2015 Lewis ................. B01J 35/0033
204/291
2017/0044679 A1* 2/2017 Jin ............................ C25B 1/02
(Continued)

OTHER PUBLICATIONS

Dong, W. J., Song, Y. J., Yoon, H., Jung, G. H., Kim, K., Kim, S., Lee, J.-L., Monolithic Photoassisted Water Splitting Device Using Anodized Ni—Fe Oxygen Evolution Catalytic Substrate, Adv. Energy Mater. Jul. 2017, 1700659. (Year: 2017).*
(Continued)

*Primary Examiner* — Luan V Van
*Assistant Examiner* — Mofoluwaso S Jebutu
(74) *Attorney, Agent, or Firm* — Owen G. Behrens; Smith & Hopen, P.A.

(57) ABSTRACT

The design of bifunctional catalysts for water splitting by modifying the electronic structure of the catalyst. That bifunctional catalyst that is synthesized is a quaternary FeNi—PSe nanoporous film (FeNi—PSe NF). A self-supported FeNi—PSE NF is synthesized and used as an anode and a cathode in a two-electrode electrolytic cell. The cell is subjected to a water source, and the FeNi—PSe NFs split the water molecules to produce hydrogen fuel. The slightly oxidized FeNi—PSe surface serves as an active site for oxygen evolution reactions, making hydrogen evolution reactions and oxygen evolution reactions well-balanced, thereby improving electrolysis efficiency.

19 Claims, 10 Drawing Sheets

(51) Int. Cl.

| | | |
|---|---|---|
| B01J 35/00 | (2024.01) | |
| B01J 35/30 | (2024.01) | |
| B01J 37/02 | (2006.01) | |
| B01J 37/28 | (2006.01) | |
| B82Y 40/00 | (2011.01) | |
| C25B 1/04 | (2021.01) | |
| C25B 11/091 | (2021.01) | |

(52) U.S. Cl.
CPC ........... *B01J 35/30* (2024.01); *B01J 37/0238* (2013.01); *B01J 37/28* (2013.01); *C25B 1/04* (2013.01); *C25B 11/091* (2021.01); *B82Y 40/00* (2013.01)

(56) References Cited

U.S. PATENT DOCUMENTS

2018/0245741 A1* 8/2018 Etkind .................... F17C 1/12
2021/0002777 A1* 1/2021 Kenney ................ C25B 11/061

OTHER PUBLICATIONS

Yanru Liu, Yunmei Du, Wen-Kun Gao, Bin Dong, Yi Han, Lei Wang, Surface phosphorsulfurization of NiCo2O4 nanoneedles supported on carbon cloth with enhanced electrocatalytic activity for hydrogen evolution, Electrochimica Acta 290 (2018) 339-346 (Year: 2018).*

Sengeni Anantharaj et al., Recent Trends and Perspectives in Electrochemical Water Splitting with an Emphasis on Sulfide, Selenide, and Phosphide Catalysts of Fe, Co, and Ni: A Review, ACS Catalysis 20166 (12), 8069-8097 (Year: 2016).*

Qian, M., Cui, S., Jiang, D., Zhang, L., Du, P., Highly Efficient and Stable Water-Oxidation Electrocatalysis with a Very Low Overpotential using FeNiP Substitutional-Solid-Solution Nanoplate Arrays, Adv. Mater. 2017, 29, 1704075. (Year: 2017).*

Juanjuan Huo, Yali Chen, Yan Liu, Jiaojiao Guo, Li Lu, Wenxian Li, Yong Wang, Hao Liu, Bifunctional iron nickel phosphide nanocatalysts supported on porous carbon for highly efficient overall water splitting, Sustainable Materials and Technologies, vol. 22,2019, e00117 (Year: 2019).*

Kaili Liu, Fengmei Wang, Tofik Ahmed Shifa, Zhenxing Wang, Kai Xu, Yu Zhang, Zhongzhou Cheng, Xueying Zhana and Jun He, An efficient ternary CoP2xSe2(1-x) nanowire array for overall water splitting, Nanoscale, Sep. 2017, 3995-4001 (Year: 2017).*

Jiachen Li, Shengwen Li, Jun Pu, Chenglin Zhong, Qingwen Zhou, Zihan Shen, Huigang Zhang, Haixia Ma, Electronic modulation of nickel phosphide by iron doping and its assembly on a graphene framework for efficient electrocatalytic water oxidation, Journal of Alloys and Compounds, vol. 824, 2020, 153913 (Year: 2020).*

Jing-Qi Chi, Xiao Shang, Fei Liang, Bin Dong, Xiao Li, Yan-Ru Liu, Kai-Li Yan, Wen-Kun Gao, Yong-Ming Chai, Chen-Guang Liu, Facile synthesis of pyrite-type binary nickel iron diselenides as efficient electrocatalyst for oxygen evolution reaction, Applied Surface Science, vol. 401, 2017, pp. 17-24 (Year: 2017).*

Anantharaj, Sengeni et al. Recent Trends and Perspectives in Electrochemical Water Splitting with an Emphasis on Sulfide, Selenide, and Phosphide Catalysts of Fe, Co, and Ni: A Review. ACS Catal. Jun. 2016, 8069-8097.

Chang, Jinfa et al. Sulfur-Doped Nickel Phosphide Nanoplates Arrays: A Monolithic Electrocatalyst for Efficient Hydrogen Evolution Reactions. ACS Appl. Mater. Interfaces Oct. 2018, (31), 26303-26311.

Chang, Jinfa et al. Ultrathin cobalt phosphide nanosheets as efficient bifunctional catalysts for a water electrolysis cell and the origin for cell performance degradation. Green Chem. 2016, 18 (8), 2287-2295.

Chang, Jinfa et al. Cobalt phosphosulfide in the tetragonal phase: a highly active and durable catalyst for the hydrogen evolution reaction. J. Mater. Chem. A 2018, 6 (26), 12353-12360.

Chang, Jinfa et al. Stable Fe2P2S6 Nanocrystal Catalyst for High-Efficiency Water Electrolysis. Small Methods 2020, 1900632.

Chang, Jinfa et al. Surface Oxidized Cobalt-Phosphide Nanorods As an Advanced Oxygen Evolution Catalyst in Alkaline Solution. ACS Catal. May 2015, 6874-6878.

Du, Yeshuang et al. Colloidal synthesis of urchin-like Fe doped NiSe2 for efficient oxygen evolution. Nanoscale Sep. 2017, (20), 6821-6825.

Konkena, Bharathi et al. Metallic NiPS3@NiOOH Core—Shell Heterostructures as Highly Efficient and Stable Electrocatalyst for the Oxygen Evolution Reaction. ACS Catal. Jul. 2017, 229-237.

Liang, Kun et al. Overall Water Splitting with Room-Temperature Synthesized NiFe Oxyfluoride Nanoporous Films. ACS Catalysis Jul. 2017, (12), 8406-8412.

Qian, Manman et al. Highly Efficient and Stable Water-Oxidation Electrocatalysis with a Very Low Overpotential using FeNiP Substitutional-Solid-Solution Nanoplate Arrays. Adv Mater. 2017, 29 (46), 1704075.

Wang, Pengyan et al. Coupling NiSe2—Ni2P heterostructure nanowrinkles for highly efficient overall water splitting. Journal of Catalysis 377 (2019) 600-608.

Zhou, Haiqing et al. One-step synthesis of self-supported porous NiSe2/Ni hybrid foam: An efficient 3D electrode for hydrogen evolution reaction. Nano Energy (2016) 20, 29-36.

* cited by examiner

METHOD OF SYNTHESIZING HIGH-EFFICIENCY BIFUNCTIONAL ELECTROCATALYSTS

CROSS-REFERENCE TO RELATED APPLICATIONS

This nonprovisional application is a continuation of and claims priority to provisional application No. 63/026,471, entitled "Method of synthesizing high-efficiency bifunctional electrocatalysts," filed May 18, 2020, by the same inventors.

BACKGROUND OF THE INVENTION

1. Field of the Invention

This invention relates, generally, to high-efficiency electrocatalysts. More specifically, it relates to methods of synthesizing high-efficiency bifunctional electrocatalysts, using quaternary iron/nickel phosphoselenide nanoporous films (FeNi—PSe NFs) that facilitate renewable energy-based hydrogen production.

2. Brief Description of the Prior Art

Hydrogen ($H_2$) is a promising alternative to traditional fossil fuels because of its high energy density of 142 MJ $kg^{-1}$ and clean emissions. Electrochemical water splitting in alkaline media is a critical approach to produce high-purity $H_2$ without carbon emission. Currently, platinum group metal (PGM) catalysts such as Pt and $IrO_2$ are dominantly used for water electrolysis due to their good electrical conductivity and proper electronic structures for hydrogen evolution reactions and oxygen evolution reactions (HER and OER), respectively. However, water electrolysis cannot compete with the traditional mass production of $H_2$ from fossil fuels by steam methane reforming and coal gasification because of the high cost and low efficiency of PGM catalysts in actual electrolyzers. Accordingly, it is urgent and necessary to develop cost-effective, high-efficiency, and stable non-PGM catalysts for practical water electrolysis.

In addition, it is desired to design nanostructured bifunctional catalysts in order to catalyze both HER and OER under the same electrolyte circumstance, thereby simplifying the electrolyzer design and facilitating the mass/charge transfer. However, designing high-efficiency bifunctional catalysts is challenging due to the different surface active sites and reaction kinetics for HER and OER catalysts in an integrated electrolyzer. Moreover, current state-of-the-art HER and OER catalysts are typically effective in only one of strongly acidic or alkaline solutions, leading to contamination and electrolyzer corrosion. For example, transition metal phosphides (TMPs) are considered as efficient HER catalysts due to the co-existence of proton-acceptor sites (negatively charged P atoms) and hydride-acceptor sites (isolated M atoms; M=Fe, Co, Ni, and other transition metals) on the material surface, resulting in a facilitated HER through an ensemble effect. Nevertheless, the surfaces of TMPs gradually oxidize in an ambient atmosphere, leading to HER performance decay. On the other hand, the slightly oxidized surfaces of TMPs are usually regarded as the active sites for OER, meaning that the TMPs could be used as bifunctional catalysts if a proper trade-off between HER and OER performance is achieved.

Accordingly, what is needed is a bifunctional catalyst that can efficiently catalyze overall water splitting using pure water or seawater to significantly increase the lifetime of the electrolyzer and greatly reduce the cost for hydrogen production. However, in view of the art considered as a whole at the time the present invention was made, it was not obvious to those of ordinary skill in the field of this invention how the shortcomings of the prior art could be overcome.

While certain aspects of conventional technologies have been discussed to facilitate disclosure of the invention, Applicant in no way disclaims these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for an efficient and reusable electrolyzer and method of splitting water for hydrogen production is now met by a new, useful, and nonobvious invention.

The novel method includes the formation of a self-supported quaternary iron-nickel phosphoselenide nanoporous film. The film is formed by anodically converting an electrodeposited iron-nickel alloy film to an iron-nickel-oxygen nanofilm. The iron-nickel-oxygen nanofilm is thermally treated via a phosphorization treatment followed by a selenylation treatment using chemical vapor deposition, forming an iron-nickel-phosphorus nanofilm. The iron-nickel-phosphorus nanofilm is then formally treated with selenium vapor to partially substitute selenium for phosphorus, forming a quaternary iron-nickel phosphoselenide nanoporous film bifunctional catalyst. The selenium stabilizes the catalyst and improving the electrical conductivity of the catalyst. A plurality of pores are formed through the quaternary iron-nickel phosphoselenide nanoporous film, such that the plurality of pores improve a transportation of mass through the nanoporous film. In an embodiment, the film includes a thickness of 5 µm; in an embodiment, the firm is disposed on a surface of an unreacted iron-nickel alloy matrix. An embodiment of the film includes at least 10% iron by volume, at least 65% nickel by volume, at least 0.5% phosphorus by volume, and at least 23% selenium by volume.

The quaternary iron-nickel phosphoselenide nanoporous film is used as an anode and a cathode in a two-electrode electrolytic cell. The two-electrode electrolytic cell is subjected to a water source, such as seawater, and the quaternary iron-nickel phosphoselenide nanoporous film splits water molecules in the water source. The quaternary iron-nickel phosphoselenide nanoporous film is capable of both hydrogen evolution reactions and oxygen evolution reactions because the quaternary iron-nickel phosphoselenide nanoporous film includes an oxidized surface as an active site for the oxygen evolution reactions, thereby improving electrolysis efficiency. Specifically, the hydrogen evolution reactions convert the amount of water into hydrogen fuel that is usable as a renewable energy source.

An object of the invention is to reduce the cost of hydrogen production for energy uses by efficiently catalyzing water splitting using pure water or seawater, thereby significantly increasing the lifetime of an electrolyzer used in the water splitting method.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

Figure 1:
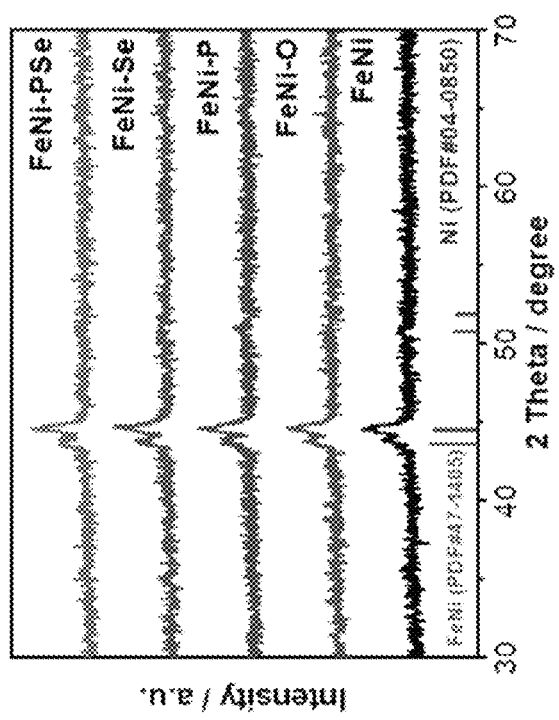
FIG. 1 depicts x-ray diffraction patterns, comparing FeNi films, FeNi—O films, FeNi—P films, FeNi—Se films, and FeNi—PSe nanofilms.

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

The present invention includes the design of bifunctional catalysts for water splitting by modifying the electronic structure of the catalyst. That catalyst used herein is a quaternary FeNi—PSe nanoporous film (FeNi—PSe NF). Metal phosphoselenides are used due to the weaker bond strength of Se—H (276 kJ/mol) as compared with P—H (322 kJ/mol), leading to a better capability for the selenides to capture the reactants and accelerate a subsequent discharge step. Meanwhile, the slightly oxidized FeNi—PSe surface serves as an active site for OER, making HER and OER well-balanced. Furthermore, Fe-doping was used to further improve the OER activities and conductivities of Ni—PSe under alkaline media by forming high valence nickel. The designed FeNi—PSe NFs are self-supported and can be directly used as bifunctional catalysts without adding any additives, allowing the direct investigation of the synergistic effects among the quaternary elements (Ni, Fe, Se, and P) for overall water splitting without interference from carbon and other additives.

The quaternary FeNi—PSe NFs were synthesized by anodically converting the electrodeposited FeNi alloy films (atomic ratio of Fe:Ni=15:85) to FeNi—O NFs followed by thermal treatments (firstly phosphorization, followed by selenylation) using a chemical vapor deposition (CVD) apparatus. Due to the oxygen/moisture-sensitivity of TMPs, the FeNi—P NFs were further thermally treated under selenium vapor in order to partially substitute P by Se. The incorporation of Se in the quaternary FeNi—PSe NFs plays dual roles of stabilizing the catalysts in the air and improving the electrical conductivity of the catalysts. The methods of synthesizing the Fe-Ni—PSe NFs are described in greater detail herein below.

Synthesis of FeNi—PSe Nanofilms

FeNi alloys were synthesized in an electrolyte bath prepared in an aqueous plating solution by dissolving $Ni_2SO_4 \cdot 6H_2O$, $NiCl_2 \cdot 6H_2O$, $FeSO_4 \cdot 7H_2O$, $H_3BO_3$, $Na_3C_6H_5O_7 \cdot 2H_2O$ and saccharin with a certain amount in distilled water and then stirring for 30 min at room temperature. A bottom-up electrochemical deposition of FeNi alloy films was performed in a home-made two-electrode cell with stainless steel substrate as the cathode and a Pt mesh as the anode at a current density of 25 mA cm$^{-2}$ for 20 min. FeNi—O NFs were then synthesized via a top-down anodic treatment at a constant voltage of 20 V for 20 min in an electrolyte of 0.2 M $NH_4F$ and 2 M $H_2O$ in ethylene glycol.

The obtained FeNi—O films were placed at the downstream side while $NaH_2PO_2$ was placed at the upstream side in a tube furnace. The tube was evacuated to 50 mTorr for at least 10 min and then purged with Ar to remove the residual air. Then, the furnace upstream and downstream of the tube furnace was maintained at 250° C. and 300° C. for 15 min with a heating rate of 5° C. min$^{-1}$. During the reaction, Ar (100 sccm) was used as a carrier gas; after cooling to room temperature, Se powder was placed at the upstream to replace the residual $NaH_2PO_2$, and the furnace upstream and downstream of the tube furnace were both kept at 300° C. for another 15 min to obtain FeNi—PSe NFs.

As control experiments, FeNi—P NFs and FeNi—Se NFs were prepared without using Se and P sources, respectively.

Figure 2:
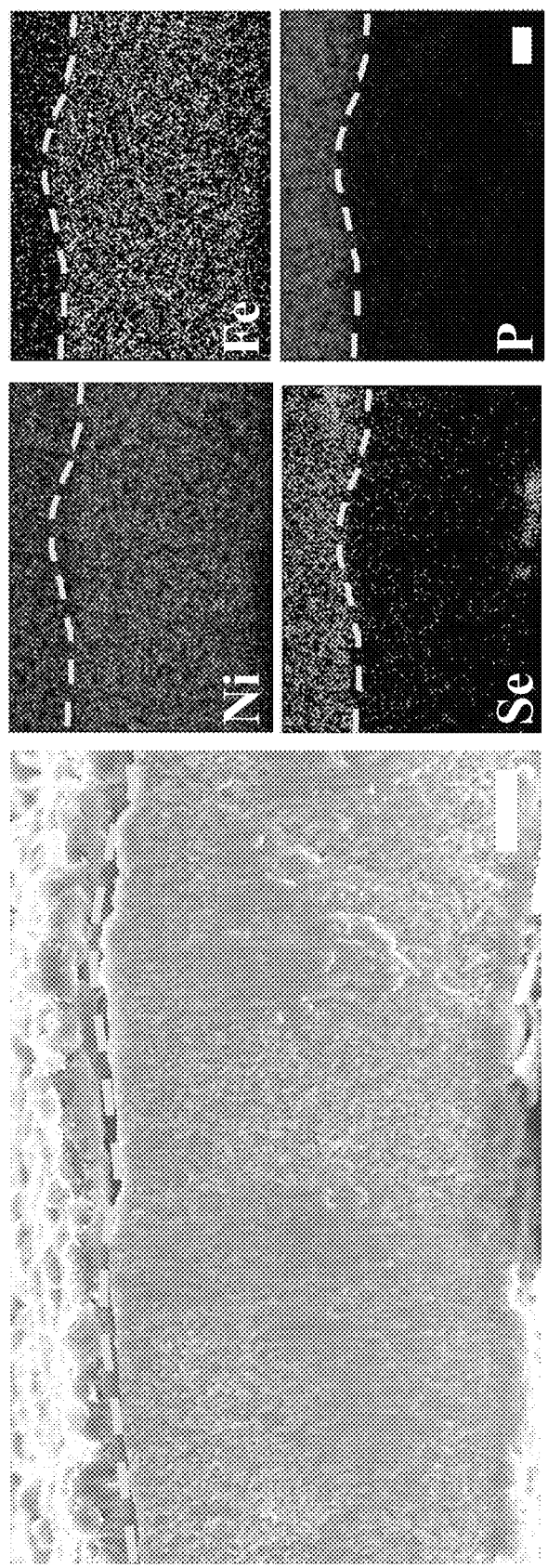
FIG. 2 is a scanning electron microscopy image of a FeNi—PSe nanofilm.

As shown in FIG. 1, only the characteristic peaks of the metallic FeNi films could be found from the XRD patterns due to the much higher contents and stronger intensities for the diffraction peaks of FeNi films. The cross-sectional scanning electron microscopic (SEM) images and elemental mapping, shown in FIG. 2, indicate the formation of a porous structure throughout the entire film with a total thickness of 5 μm, including a thin layer of FeNi—PSe NFs (600 nm) on the surface of unreacted FeNi alloy matrix. The pores help to accelerate the mass transportation through the film. The contents of Fe, Ni, P, and Se in the FeNi—PSe NFs were estimated to be 10.5 wt %, 65.1 wt %, 0.7 wt %, and 23.7 wt %. The much higher content of Se than that of P is due to the substitution of P with Se during the CVD treatments.

Figure 3:
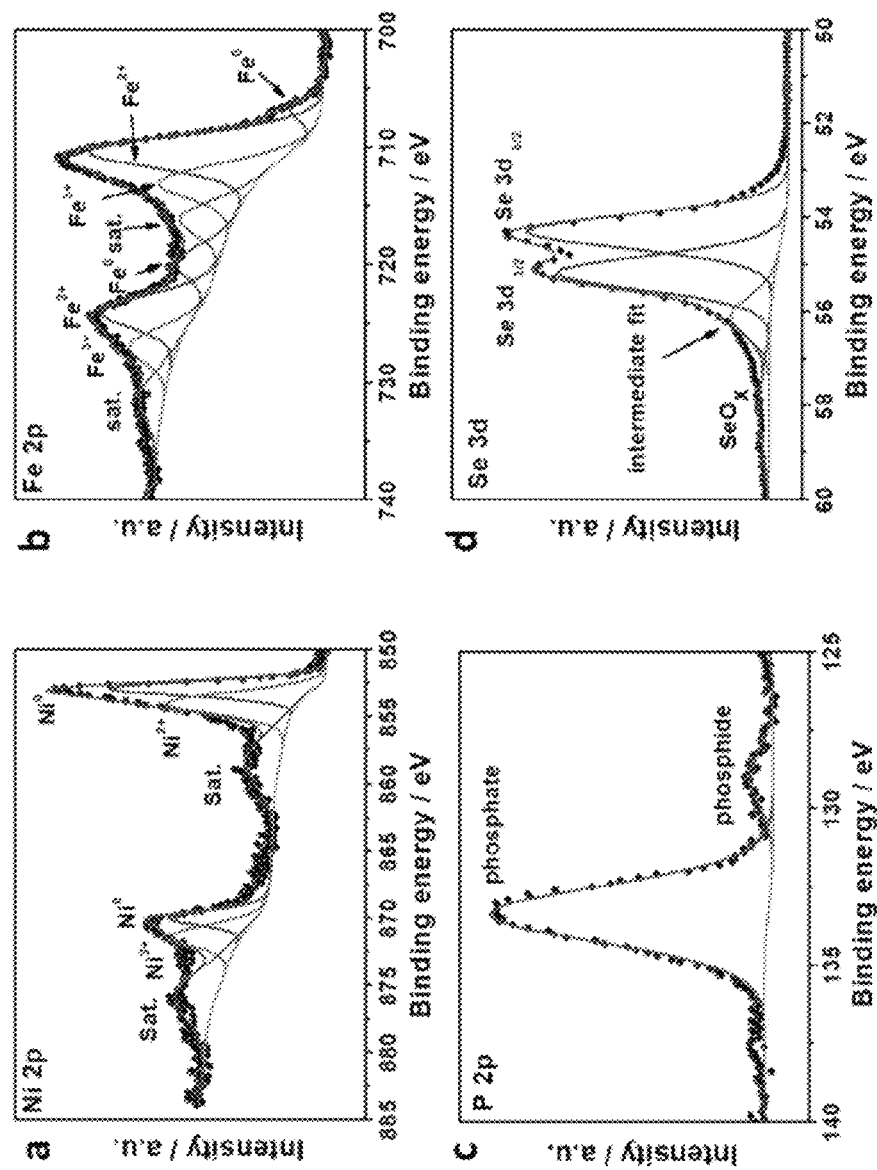
FIG. 3 is a graphical representation of high-resolution XPS profiles for a FeNi—PSe nanofilm.

FIG. 3 shows the high-resolution XPS Ni 2p profile for the FeNi—PSe NFs (in section A) having three sets of peaks at 853.0 eV/870.3 eV, 854.5 eV/872.8 eV, and 859.0 eV/876.3 eV corresponding to the metallic $Ni^0$, $Ni^{2+}$, and the Ni satellite peaks, respectively. The XPS Fe 2p profile (in section B) shows peaks located at 706.1 eV and 712.4 eV, which are attributed to the $Fe^0$ and $Fe^{3+}$, respectively. The XPS P 2p profile (in section C) shows that the peaks located at 129.0 eV and 133.4 eV are attributed to the phosphide and phosphate species, respectively. The XPS Se 3d profile (in section D) shows the peaks at 54.2 eV and 55.0 eV corresponding to Se $3d_{5/2}$ and Se $3d_{3/2}$, respectively, which are the core level bands of Se 3d in $NiSe_2/FeSe_2$. In addition, the intermediate fitting lines at 55.9 eV and 58.3 eV are associated with the slightly oxidized surface.

Performance of the Catalysts

The electrochemical HER and OER performance of the catalysts was firstly studied in a three-electrode system using Ar-saturated 1 M KOH solution as an electrolyte to make a comparison with the commercial Pt/C (platinum decorated carbon) (20 wt %) and $IrO_2$ benchmark catalysts. The onset potential for the FeNi—PSe NFs (shown in section A of FIG. 4) is 29 mV, which is much lower than those of FeNi—P NFs (230 mV) and FeNi—Se NFs (135 mV), and very close to the commercial Pt/C (0 mV). To reach a current density of 10 mA $cm^{-2}$, the FeNi—PSe NFs, FeNi—P NFs, and FeNi—Se NFs require η of 172 mV, 337 mV, and 295 mV, respectively. Tafel slopes are usually used to detect the rate-determining step (RDS) for HER through the following pathways:

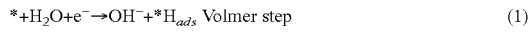  Volmer step (1)

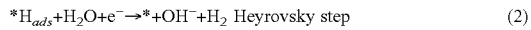  Heyrovsky step (2)

  Tafel step (3)

where * denotes the surface active site. As shown in section C of FIG. 4, the FeNi—PSe NFs have a much smaller Tafel slope (101 mV $dec^{-1}$) than FeNi—P NFs (125 mV $dec^{-1}$) and FeNi—Se NFs (148 mV $dec^{-1}$), indicating the intrinsically favorable kinetics of FeNi—PSe NFs for HER. Hence, the RDS for FeNi—PSe NFs is dominated by the Heyrovsky step, whereas the RDS for FeNi—P NFs and FeNi—Se NFs is controlled by the Volmer step (section E of FIG. 4).

Figure 4:
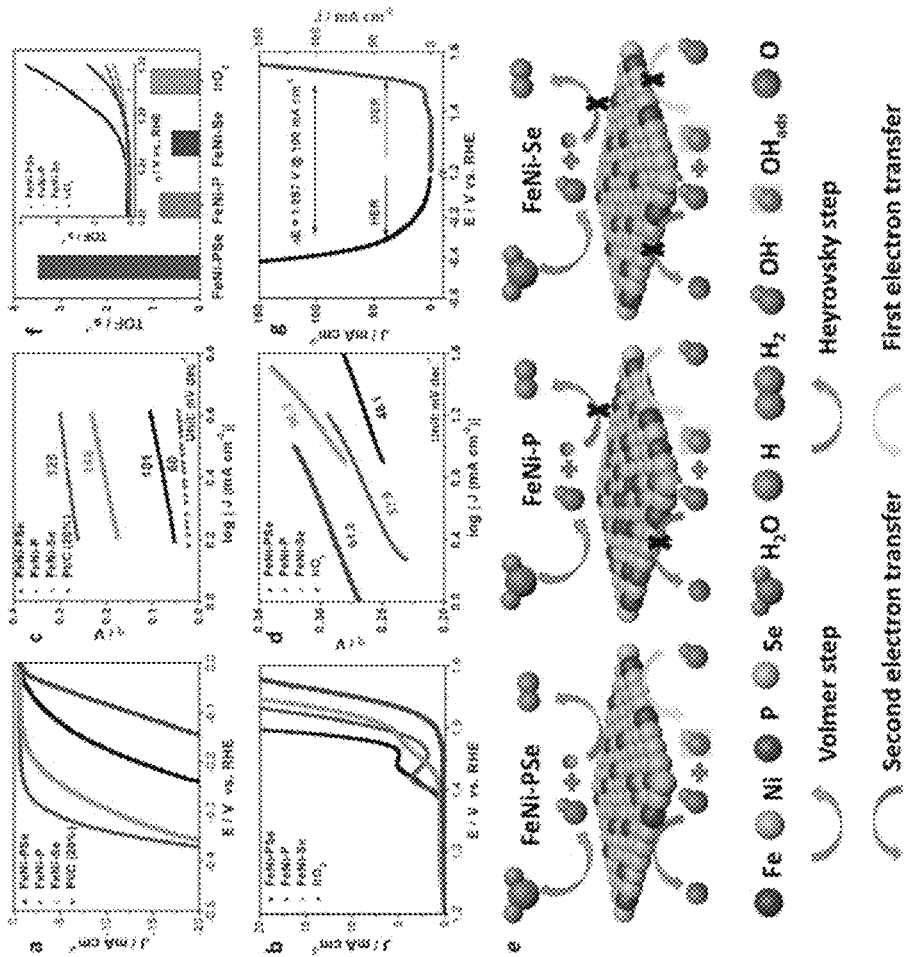
FIG. 4 depicts polarization curves, Tafel plots, turnover frequencies, and reaction pathways for a FeNi—PSe nanofilm.

The electrochemical OER performance of the catalysts was also examined by linear sweep voltammograms (LSV, as shown in section B of FIG. 4) and Tafel plots (section D of FIG. 4). The oxidation peaks located in the potential range of 1.4-1.45 V are ascribed to the oxidation of $Ni^{2+}$ to $Ni^{3+}$. The FeNi—PSe NFs show much lower overpotentials to reach the current densities of 10 $mAcm^{-2}$ and 20 $mAcm^{-2}$ (η of 254 mV and 267 mV, respectively) than those of FeNi—P NFs (η of 279 mV and 332 mV, respectively) and FeNi—Se NFs (η of 290 mV and 317 mV, respectively). It should be noted that the OER performance of FeNi—P NFs is better than the FeNi—Se NFs because it is easier to form the oxidized surface on the FeNi—P NFs for OER. More importantly, all the nanoporous film catalysts show better OER performance than the commercial $IrO_2$. The Tafel slope of FeNi—PSe NFs (48.1 mV $dec^{-1}$) is much lower than those of FeNi—P NFs (57.9 mV $dec^{-1}$) and FeNi—Se NFs (96.3 mV $dec^{-1}$), indicating different RDS and reaction kinetics for OER (shown in section E of FIG. 4) according to the most accepted four-electron reaction steps in alkaline solution:

 (4)

 (5)

 (6)

 (7)

Figure 6:
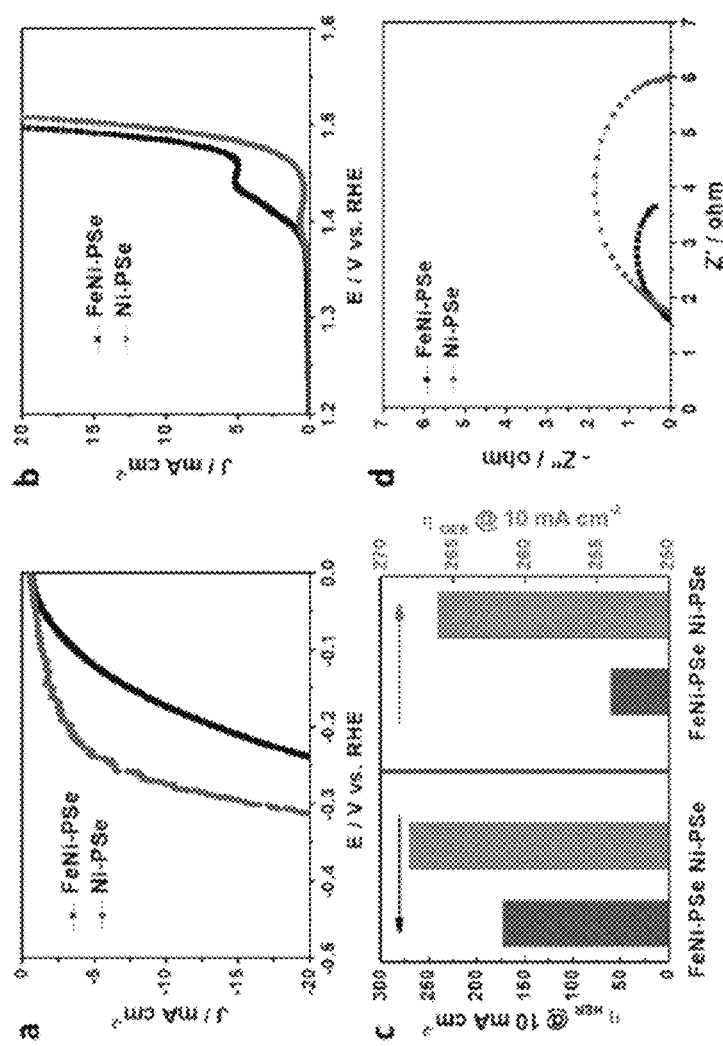
FIG. 6 graphically compares Ni—PSe NFs with FeNi—PSe NFs by comparing hydrogen evolution reactions and oxygen evolution reactions thereof.

Typically, in a multi-electron involved OER process, the Tafel slopes of 24 mV $dec^{-1}$, 40 mV $dec^{-1}$, and 60 mV $dec^{-1}$ imply that the third-electron transfer, the second-electron transfer, and the chemical step following the first-electron transfer are the RDS, respectively. Distinctly, the FeNi—PSe NFs have a Tafel slope of 48.1 mV $dec^{-1}$, indicating that the second-electron transfer process is the RDS (shown in section E of FIG. 4). However, the RDS for FeNi—P NFs is the first-electron transfer process. The large Tafel slope of FeNi—Se NFs indicates that the RDS is limited by the initial step during which the catalyst surface is strongly bonded with —OH groups. In contrast, the small Tafel slope of FeNi—PSe NFs suggests that the RDS is at the final step of the multiple-electron transfer processes, proving an excellent OER activity. As compared to HER, OER is kinetically sluggish and eventually determines the efficiency of the overall water splitting. In order to further examine the OER activities of the catalysts, turnover frequency (TOF) was calculated as shown in section F in FIG. 4. The TOF at the overpotential of 0.3 V for FeNi—PSe NFs is about 3.48 $s^{-1}$, which surpasses FeNi—P NFs (0.85 $s^{-1}$), FeNi—Se NFs (0.59 $s^{-1}$), and $IrO_2$ (1.06 $s^{-1}$) by 4.1 times, 5.9 times, and 3.3 times, respectively. The high TOF of FeNi—PSe NFs undisputedly suggests a supreme activity towards OER, contributing to the improved electrolysis efficiency. The bifunctional HER/OER activities of FeNi—PSe NFs were further investigated in a three-electrode system, as shown in section G of FIG. 6. A potential of 1.897 V is required to deliver a high current density of 100 mA·$cm^{-2}$ for overall water splitting.

Water Splitting Performance

Figure 5:
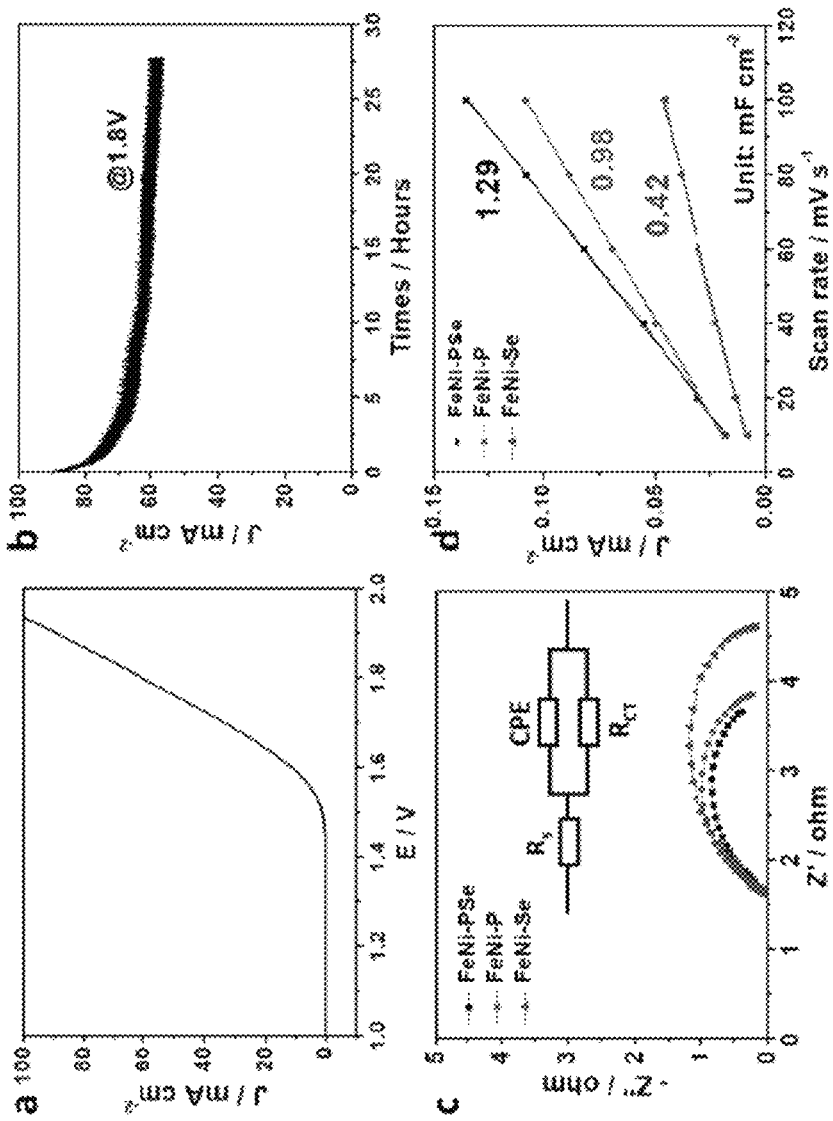
FIG. 5 is a graphical representation of electrochemical performance of FeNi—PSe nanofilms for overall water splitting implementations.

A two-electrode electrolytic cell using the FeNi—PSe NFs as both anode and cathode was employed to study the practical water splitting performance. The potentials of 1.59 V and 1.93 V were required to deliver current densities of 10 mA $cm^{-2}$ and 100 mA $cm^{-2}$, respectively (as shown in section A of FIG. 5), superior to the state-of-the-art bifunctional catalysts for overall water splitting. A further I-t curve testing (shown in section B of FIG. 5) shows that approximately 66% current can be well maintained at 1.8 V for more than 100000 s (27.7 hours).

Figure 7:
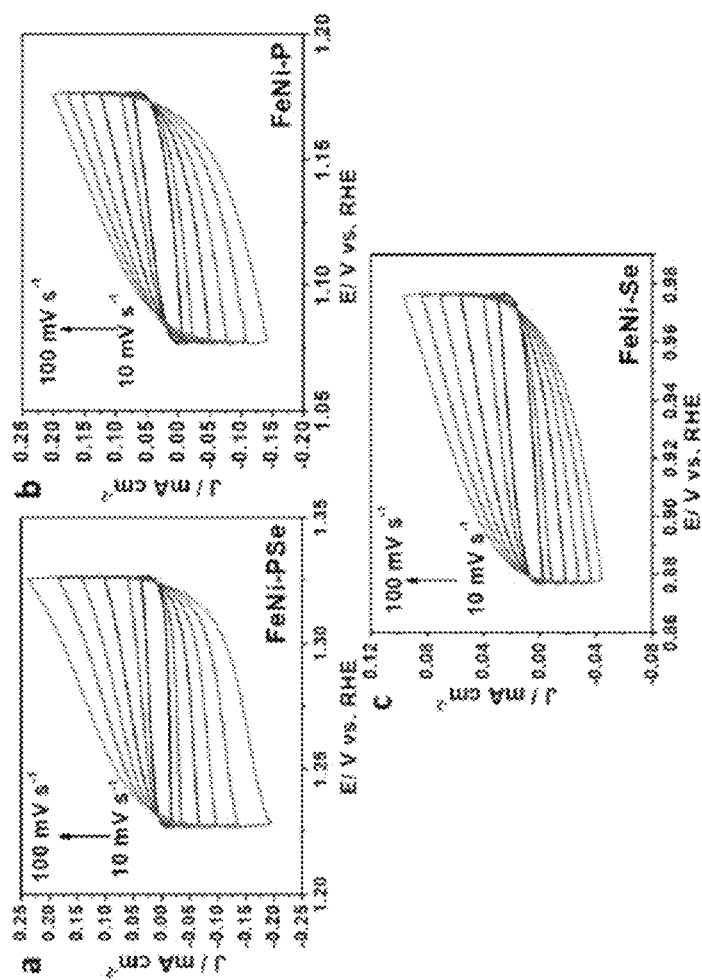
FIG. 7 depicts scan-rate dependent cyclic voltammetry values for FeNi—PSE NFs, FeNi—P NFs, and FeNi—Se NFs, at scan rates of 10, 20, 40, 60, 80, and 100 mVs$^{-1}$.

Electrochemical impedance spectroscopy (EIS) was used to probe the reaction kinetics for the catalysts. The Nyquist plots (shown in section C of FIG. 5) and the corresponding equivalent circuit at an overpotential of 0.3 V shows that the system resistance ($R_S$) is approximately equal for all the catalysts (1.6Ω, shown in Table 1 below). The charge transfer resistance ($R_{CT}$) of FeNi—PSe NFs is much smaller than those of two control catalysts, indicating a greatly enhanced conductivity, facilitated electron transfer, and thus improved catalytic activity for water splitting by forming quaternary alloy phosphoselenide. In addition, the Ni—PSe NFs without Fe-doping (shown in section A-C of FIG. 6) show a much inferior HER/OER performance than the FeNi—PSe NFs due to the low conductivity (shown in section D of FIG. 6). The double-layer capacitance ($C_{DL}$) calculated from the CV curves (shown in FIG. 7) was used to estimate the electrochemically active surface areas of the nanoporous film catalysts. The $C_{DL}$ of FeNi—PSe NFs, FeNi—P NFs, and FeNi—Se NFs was estimated to be 1.29 mF cm$^{-2}$, 0.98 mF cm$^{-2}$, and 0.42 mF cm$^{-2}$ (shown in FIG. 7), respectively, indicating that the FeNi—PSe NFs have a much higher surface area than the other two counterparts for the catalytic reactions.

TABLE 1

System resistance ($R_S$) and charge resistance ($R_{CT}$) for three samples

| Sample | $R_S$ (Ω) | $R_{CT}$ (Ω) |
|---|---|---|
| FeNi—PSe NFs | 1.61 | 1.13 |
| FeNi—P NFs | 1.60 | 1.58 |
| FeNi—Se NFs | 1.62 | 2.15 |

Figure 8:
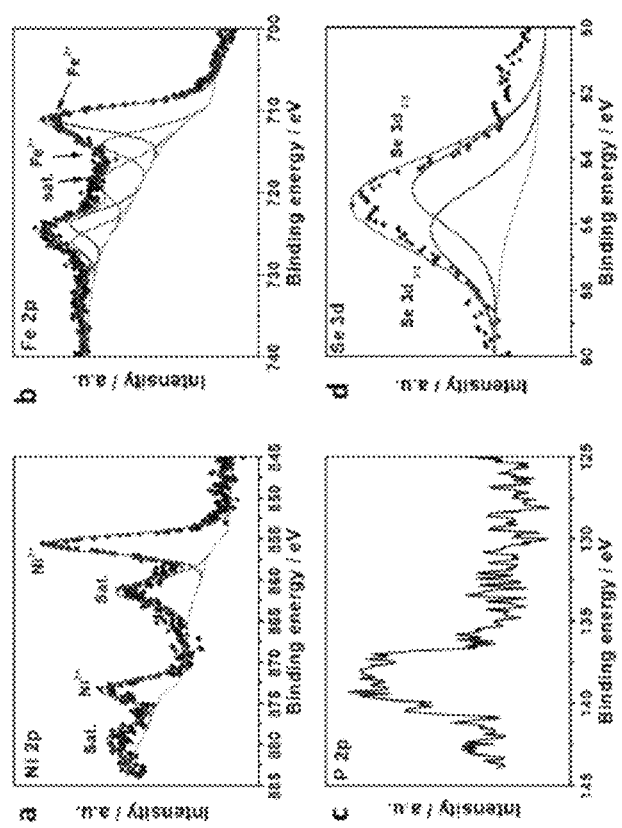
FIG. 8 is a graphical representation of high-resolution XPS profiles for a FeNi—PSe nanofilm after hydrogen evolution reaction testing.
Figure 9:
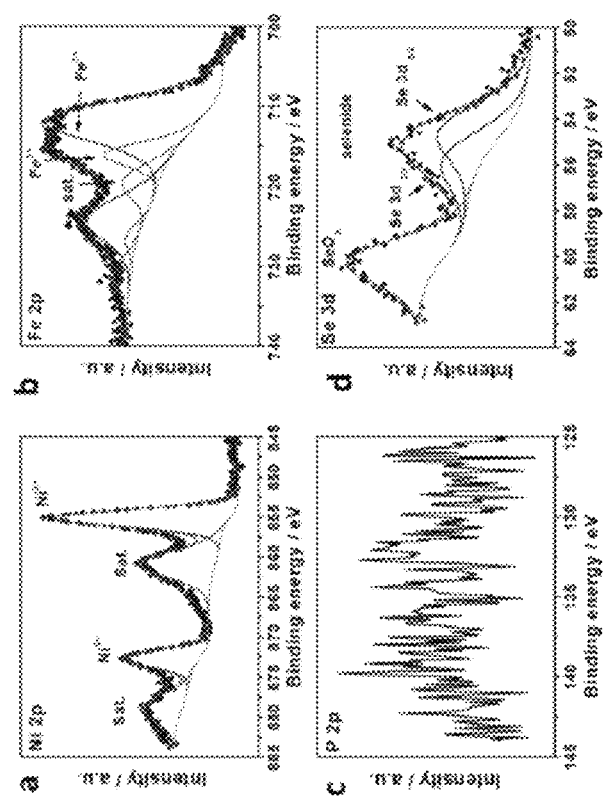
FIG. 9 is a graphical representation of high-resolution XPS profiles for a FeNi—PSe nanofilm after oxygen evolution reaction testing.

XPS was also performed on the catalysts after long-term HER (as shown in FIG. 8) and OER (as shown in FIG. 9) stability tests, which shows the disappearance of Ni$^0$ and Fe$^0$ due to the surface reconstruction under harsh conditions (high pH and high polarization) used for water splitting. Similarly, in the XPS P 2p profiles, the metal phosphide phase on the catalyst surface was well preserved during HER (shown in section C of FIG. 8); however, the phosphide was oxidized to the high valence state P during OER (shown in section C of FIG. 9). The XPS Se 3d profiles show a similar characteristic to the P 2p, where the core level bands of Se 3d still presents after HER test shown in section D of FIG. 8) but was oxidized to SeO$_x$ peaks after OER (section D of FIG. 9) due to the surface reconstruction.

Traditionally, strongly acidic and alkaline solutions are widely used for water splitting because of the increased ionic conductivities, thus making the dissociation of water quickly and efficiently. According to the pH of the feedstock solutions, water electrolysis is usually categorized into proton and anion exchange membrane (PEM and AEM) electrolyzer. So far, PEM and AEM electrolyzers are still limited by the high cost and low efficiency of PGM catalysts. An ideal and ultimate strategy to replace the traditional electrolyzers operated under harsh conditions (either strongly acidic or alkaline) is to use pure water or even natural seawater as feedstock solutions because they have low corrosion to the electrolyzers and catalysts. Especially, seawater covers 70% surface of the earth crust, which is naturally available for the mass production of $H_2$ at low cost.

Figure 10:
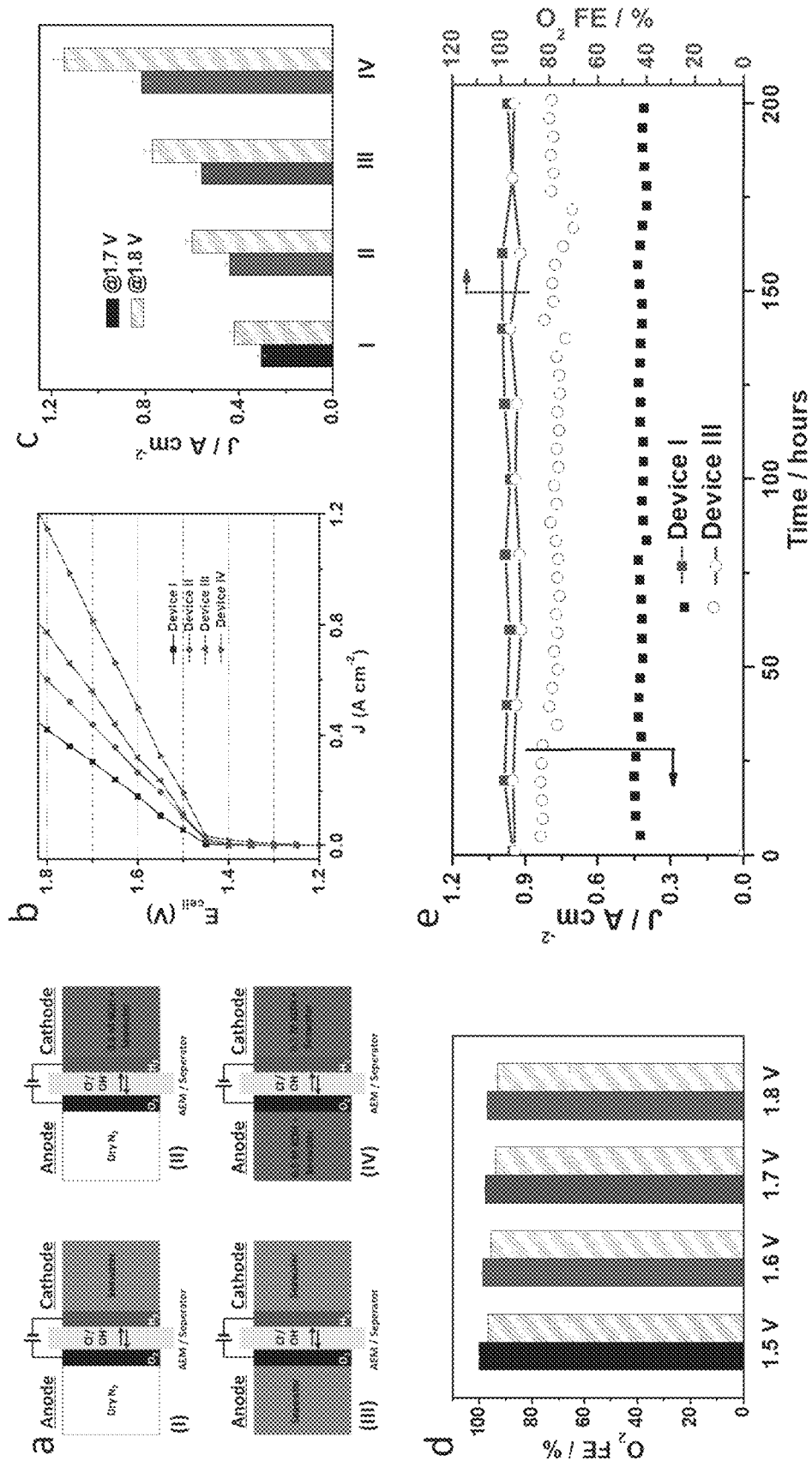
FIG. 10 is a graphical representation of water electrolyzer performance using FeNi—PSe nanofilms.

In order to demonstrate the possibility seawater splitting, a practical AEM electrolyzer was employed to explore the performance of the rationally designed FeNi—PSe NFs using four different independent electrolyte feed ways, namely (I-IV) as shown in section A of FIG. 10. The current densities of 0.305 A cm$^{-2}$, 0.44 A cm$^{-2}$, 0.559 A cm$^{-2}$, and 0.815 A cm$^{-2}$ were achieved at an electrolysis voltage of 1.7 V when using (I-IV) feeding modes (Sections B and C of FIG. 10), respectively. The current densities further increased to 0.421 A cm$^{-2}$, 0.6 A cm$^{-2}$, 0.769 A cm$^{-2}$, and 1.144 A cm$^{-2}$ for (I-IV), respectively, when the voltage was set at 1.8 V. Noticeably, the seawater electrolysis performance achieved by the FeNi—PSe NFs meet the demanding requirements (0.4-1 A cm$^{-2}$) for the practical application in the industries. Furthermore, the $O_2$ Faraday efficiency (FE) at 1.8 V using device III was examined by gas chromatography (GC). The $O_2$ FE over 97% (Section D of FIG. 10, solid histograms) was detected when using natural seawater as the cathode feedstock solution (Section A of FIG. 10, device I). If the conventional symmetric seawater feeding (Section A of FIG. 10, device III) was employed, the $O_2$ FE above 92% was achieved (Section D of FIG. 10, histograms with inclined pattern). A 200 hour continuous and stable operation of electrolyzer was further demonstrated using the asymmetric (device I in FIG. 10) and symmetric (device III in FIG. 10a) models of natural seawater feeding (Section E of FIG. 10). During the continuous testing at a cell voltage ($E_{cell}$) of 1.8 V, well maintained current densities at 0.41 A cm$^{-2}$ and 0.8 A cm$^{-2}$ with the $O_2$ $FE_{O2}$ above 95% and 92%, respectively, were obtained. More importantly, the electrolysis efficiency of 78.4% at 1.6V was gained, which is superior to the Department of Energy (DOE) 2020 target (77%).

Conclusion

The FeNi—PSe NFs show greatly improved activities towards overall water splitting in alkaline solution with overpotentials (η) of 0.17 V and 0.25 V to reach a current density of 10 mA cm$^{-2}$ for HER and OER, respectively. Moreover, the turnover frequency (TOF) for OER at η of 0.3 V is 3.48 s$^{-1}$, which is 2.3 times higher than that of IrO$_2$. When used as bifunctional catalysts in an actual water electrolyzer using pure water and even seawater as feedstock solutions, an electrolysis efficiency of 78.4% was obtained, higher than those of the state-of-the-art electrolyzers.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A method of synthesizing a bifunctional catalyst for water splitting applications, the method comprising the steps of:
    forming a self-supported quaternary iron-doped nickel phosphoselenide nanoporous film by:
        performing a top-down anodic conversion of an iron-doped nickel alloy film to form an iron-doped nickel-oxygen nanofilm;
        thermally treating, via a tube furnace, the iron-doped nickel-oxygen nanofilm via a phosphorization treatment using a bottom-up chemical vapor deposition, forming an iron-doped nickel-phosphorus nanofilm;
        subsequent to forming the iron-doped nickel-phosphorus nanofilm, cooling the tube furnace to room temperature for a predetermined period of time; and
        thermally treating, via the tube furnace, the iron-doped nickel-phosphorus nanofilm with selenium vapor, using the bottom-up chemical vapor deposition, to partially substitute selenium for phosphorus, forming a quaternary iron-doped nickel phosphoselenide nanoporous film bifunctional catalyst;

wherein the quaternary iron-doped nickel phosphoselenide nanoporous film bifunctional catalyst comprises high valence nickel;

wherein the selenium stabilizes the bifunctional catalyst and improves an electrical conductivity of the bifunctional catalyst;

wherein the quaternary iron-doped nickel phosphoselenide nanoporous film includes an oxidized surface as an active site for oxygen evolution reactions, such that the quaternary iron-doped nickel phosphoselenide nanoporous film is capable of both hydrogen evolution reactions and oxygen evolution reactions during a water splitting application, thereby improving electrolysis efficiency; and wherein the quaternary iron-doped nickel phosphoselenide nanoporous film exhibits a rate-determining final electron transfer process (hereinafter "RDS") for hydrogen evolution reactions, whereby the RDS is dominated by the Heyrovsky step.

2. The method of claim 1, further comprising the step of forming a plurality of pores disposed through the quaternary iron-doped nickel phosphoselenide nanoporous film, such that the plurality of pores improve a transportation of mass through the nanoporous film.

3. The method of claim 1, wherein the quaternary iron-doped nickel phosphoselenide nanoporous film includes a thickness of 5 μm.

4. The method of claim 3, wherein the quaternary iron-doped nickel phosphoselenide nanoporous film is disposed on a surface of an unreacted iron-nickel alloy matrix.

5. The method of claim 1, wherein the quaternary iron-doped nickel phosphoselenide nanoporous film includes at least 10 wt % iron, at least 65 wt % nickel, at least 0.5 wt % phosphorus, and at least 23 wt % selenium.

6. The method of claim 1, further comprising the step of subjecting the quaternary iron-doped nickel phosphoselenide nanoporous film to an amount of water.

7. The method of claim 6, further comprising the step of converting, via the hydrogen evolution reactions, the amount of water into hydrogen fuel that is usable as a renewable energy source.

8. The method of claim 6, wherein the quaternary iron-doped nickel phosphoselenide nanoporous film exhibits a turnover frequency of about 3.48 $s^{-1}$ for oxygen evolution reactions.

9. A method of improving electrolysis efficiency during water splitting applications for improved hydrogen fuel production, the method comprising the steps of:

forming a self-supported quaternary iron-doped nickel phosphoselenide nanoporous film by:

performing a top-down anodic conversion of an iron-doped nickel alloy film to form an iron-doped nickel-oxygen nanofilm;

thermally treating, via a tube furnace, the iron-doped nickel-oxygen nanofilm via a phosphorization treatment using a bottom-up chemical vapor deposition, forming an iron-doped nickel-phosphorus nanofilm;

subsequent to forming the iron-doped nickel-phosphorus nanofilm, cooling the tube furnace to room temperature for a predetermined period of time;

thermally treating, via the tube furnace, the iron-doped nickel-phosphorus nanofilm with selenium vapor, using the bottom-up chemical vapor deposition, to partially substitute selenium for phosphorus, forming a quaternary iron-doped nickel phosphoselenide nanoporous film bifunctional catalyst;

forming a plurality of pores disposed through the quaternary iron-doped nickel phosphoselenide nanoporous film;

wherein the quaternary iron-doped nickel phosphoselenide nanoporous film bifunctional catalyst comprises high valence nickel; and wherein the quaternary iron-doped nickel phosphoselenide nanoporous film exhibits a rate-determining final electron transfer process (hereinafter "RDS") for hydrogen evolution reactions, whereby the RDS is dominated by the Heyrovsky step;

subjecting the quaternary iron-doped nickel phosphoselenide nanoporous film to an amount of water and flowing the amount of water through the plurality of pores disposed through the quaternary iron-doped nickel phosphoselenide nanoporous film; and converting the amount of water into hydrogen fuel that is usable as a renewable energy source by splitting the amount of water into hydrogen molecules and oxygen molecules by capturing the oxygen molecules on an oxidized surface of the quaternary iron-doped nickel phosphoselenide nanoporous film to perform oxygen evolution reactions, such that the hydrogen molecules are recovered via hydrogen evolution reactions.

10. The method of claim 9, wherein the quaternary iron-doped nickel phosphoselenide nanoporous film includes a thickness of 5 μm.

11. The method of claim 10, wherein the quaternary iron-doped nickel phosphoselenide nanoporous film is disposed on a surface of an unreacted iron-nickel alloy matrix.

12. The method of claim 9, wherein the quaternary iron-doped nickel phosphoselenide nanoporous film includes at least 10 wt % iron, at least 65 wt % nickel, at least 0.5 wt % phosphorus, and at least 23 wt % selenium.

13. The method of claim 9, wherein the quaternary iron-doped nickel phosphoselenide nanoporous film exhibits a turnover frequency of about 3.48 $s^{-1}$ for oxygen evolution reactions.

14. A method of synthesizing a high-efficiency bifunctional electrocatalyst, the method comprising the steps of:

forming a self-supported quaternary iron-doped nickel phosphoselenide nanoporous film by:

performing a top-down anodic conversion of an iron-doped nickel alloy film to form an iron-doped nickel-oxygen nanofilm;

thermally treating, via a tube furnace, the iron-doped nickel-oxygen nanofilm via a phosphorization treatment using a bottom-up chemical vapor deposition, forming an iron-doped nickel-phosphorus nanofilm;

subsequent to forming the iron-doped nickel-phosphorus nanofilm, cooling the tube furnace to room temperature for a predetermined period of time;

thermally treating, via the tube furnace, the iron-doped nickel-phosphorus nanofilm with selenium vapor, using the bottom-up chemical vapor deposition, to partially substitute selenium for phosphorus, forming a quaternary iron-doped nickel phosphoselenide nanoporous film bifunctional catalyst;

forming a plurality of pores disposed through the quaternary iron-doped nickel phosphoselenide nanoporous film; and wherein the quaternary iron-doped nickel phosphoselenide nanoporous film bifunctional catalyst comprises high valence nickel;

wherein the quaternary iron-doped nickel phosphoselenide nanoporous film includes at least 10 wt % iron, at least 65 wt % nickel, at least 0.5 wt % phosphorus, and at least 23 wt % selenium;

wherein the selenium stabilizes the bifunctional catalyst and improves an electrical conductivity of the bifunctional catalyst;

wherein the quaternary iron-doped nickel phosphoselenide nanoporous film includes an oxidized surface as an active site for oxygen evolution reactions, such that the quaternary iron-doped nickel phosphoselenide nanoporous film is capable of both hydrogen evolution reactions and oxygen evolution reactions during a water splitting application, thereby improving electrolysis efficiency;

wherein the quaternary iron-doped nickel phosphoselenide nanoporous film exhibits a rate-determining final electron transfer process (hereinafter "RDS") for hydrogen evolution reactions, whereby the RDS is dominated by the Heyrovsky step; and wherein the iron-doped nickel phosphoselenide nanoporous film is disposed upon at least one portion of a surface of an unreacted iron-nickel alloy.

15. The method of claim 14, wherein the quaternary iron-doped nickel phosphoselenide nanoporous film includes a thickness of 5 µm.

16. The method of claim 14, further comprising the step of subjecting the quaternary iron-doped nickel phosphoselenide nanoporous film to an amount of water.

17. The method of claim 16, further comprising the step of flowing the amount of water through the plurality of pores disposed through the quaternary iron-doped nickel phosphoselenide nanoporous film.

18. The method of claim 16, further comprising the step of converting, via the hydrogen evolution reactions, the amount of water into hydrogen fuel that is usable as a renewable energy source.

19. The method of claim 16, wherein the quaternary iron-doped nickel phosphoselenide nanoporous film exhibits a turnover frequency of about $3.48$ $s^{-1}$ for oxygen evolution reactions.

* * * * *